US010747801B2

(12) United States Patent
Accardo et al.

(10) Patent No.: US 10,747,801 B2
(45) Date of Patent: Aug. 18, 2020

(54) MEDIA CONTENT ONTOLOGY

(71) Applicant: Disney Enterprises, Inc., Burbank, CA (US)

(72) Inventors: Anthony M. Accardo, Los Angeles, CA (US); Craig R. Ferguson, Santa Monica, CA (US); Katharine S. Ettinger, Santa Monica, CA (US); Danton S. Miller, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 672 days.

(21) Appl. No.: 14/798,319

(22) Filed: Jul. 13, 2015

(65) Prior Publication Data

US 2017/0017644 A1 Jan. 19, 2017

(51) Int. Cl.
*G06F 7/00* (2006.01)
*G06F 16/41* (2019.01)
*G06F 16/28* (2019.01)
*G06F 16/22* (2019.01)

(52) U.S. Cl.
CPC .......... *G06F 16/41* (2019.01); *G06F 16/2272* (2019.01); *G06F 16/285* (2019.01)

(58) Field of Classification Search
CPC ................................................ G06F 16/2272
See application file for complete search history.

(56) References Cited

U.S. PATENT DOCUMENTS

| 7,707,162 | B2 | 4/2010 | Naphade et al. |
| 8,005,841 | B1* | 8/2011 | Walsh ..................... G06F 16/78 707/739 |
| 8,037,108 | B1* | 10/2011 | Chang .................. G06F 16/258 707/803 |
| 8,433,715 | B1 | 4/2013 | Mirhaji |
| 8,554,710 | B2 | 10/2013 | Neely, III et al. |
| 8,615,573 | B1* | 12/2013 | Walsh ................. H04N 21/266 709/223 |
| 8,799,294 | B2 | 8/2014 | Bouillet et al. |

(Continued)

OTHER PUBLICATIONS

"SOAF: Semantic Indexing System Based on Collaborative Tagging" by Doina Ana Cernea et al., Interdisciplinary Journal of E-Learning and Learning Objects, vol. 4, 2008, p. 1.13.

(Continued)

*Primary Examiner* — Eliyah S. Harper
(74) *Attorney, Agent, or Firm* — Farjami & Farjami LLP (57) ABSTRACT

There is provided a media content ontology system and method. The system includes a computing platform having a processor and a memory, a content genome database stored in the memory, and ontology software for execution by the processor. The ontology software is configured to map a media content asset to first and second content classifications based on respective first and second data, and to generate first and second content genome database entries associating the media content asset with other, correspondingly mapped, media content assets. In addition, the ontology software is configured to cross-index the first and second content genome database entries to enable identification of each of the first and second content classifications and the media content asset based on any one of the first or second content classifications or the media content asset.

26 Claims, 7 Drawing Sheets

(56) References Cited

U.S. PATENT DOCUMENTS

| | | | |
|---|---|---|---|
| 9,208,223 B1* | 12/2015 | Patil | G06N 5/022 |
| 2004/0001631 A1* | 1/2004 | Camara | G06K 9/46 |
| | | | 382/224 |
| 2009/0077094 A1 | 3/2009 | Bodain | |
| 2009/0089270 A1* | 4/2009 | Haley | G06F 16/3332 |
| 2009/0240650 A1* | 9/2009 | Wang | G06F 16/685 |
| | | | 706/54 |
| 2010/0114899 A1* | 5/2010 | Guha | G06F 16/9535 |
| | | | 707/741 |
| 2010/0250553 A1* | 9/2010 | Higuchi | G06F 16/51 |
| | | | 707/748 |
| 2010/0306197 A1 | 12/2010 | Jin et al. | |
| 2013/0046761 A1* | 2/2013 | Soderberg | G06Q 10/10 |
| | | | 707/736 |
| 2013/0138654 A1 | 5/2013 | Sathish et al. | |
| 2013/0138696 A1 | 5/2013 | Turdakov et al. | |
| 2013/0166303 A1 | 6/2013 | Chang et al. | |
| 2013/0238649 A1* | 9/2013 | Shum | G06F 16/211 |
| | | | 707/758 |
| 2013/0262371 A1* | 10/2013 | Nolan | G06Q 30/02 |
| | | | 707/603 |
| 2013/0282747 A1 | 10/2013 | Cheng et al. | |
| 2013/0325865 A1 | 12/2013 | Georgakis et al. | |
| 2014/0108460 A1 | 4/2014 | Casella dos Santos et al. | |
| 2014/0133663 A1* | 5/2014 | Grokop | G10L 17/005 |
| | | | 381/56 |
| 2014/0172864 A1* | 6/2014 | Shum | G16H 10/60 |
| | | | 707/740 |
| 2015/0234859 A1* | 8/2015 | Johnson | G06F 16/27 |
| | | | 707/612 |
| 2016/0048501 A1* | 2/2016 | Deshmukh | G06K 9/00456 |
| | | | 704/9 |

OTHER PUBLICATIONS

"A collaborative algorithm for semantic video annotation using a consensus-based social network analysis" by Trong Hai Duong et al., Aug. 7, 2014, p. 246-258 http://www.elsevier.com/locate/eswa.

"Incorporating Concept Ontology for Hierarchical Video Classification, Annotation, and Visualization" by Jianping Fan et al., IEEE, vol. 9, No. 5, Aug. 2007, p. 939-957.

"Large-Scale Concept Ontology for Multimedia" by John R. Smith et al., IEEE Computer Society, 2006, p. 1-6.

* cited by examiner

| Character Archetype | Archetype Description |
|---|---|
| Caregiver/Parent | Character who protects, cares for and helps others. |
| Contagonist/Temptor  488 | Character who tempts the protagonist and/or interferes with or delays the protagonist's quest. |
| Creator/Magician/Visionary | Character who helps make miraculous things happen or dreams and visions come true in a way that surpasses expectations, typically in furtherance of the protagonist's quest. |
| The Explorer/Action Instigator | Character who instigates action by seeking a place or reality other than the one he/she is currently within. |
| The Guardian/Mentor/Sage | Character who serves as a guide and source of knowledge for the protagonist. |
| The Hero/Protagonist | Central story figure who embarks upon some quest, journey or process that is the basis for action in a given storyline. |
| The Imposter/False Hero | Character who tries to take credit for the work the hero does and often competes with the protagonist. |
| The Information Bearer | Character who exists mainly to provide, leak or communicate information. |
| The Innocent/Child | Character who is naïve and/or pure compared to other characters in the story and/or is targeted as a victim, frequently as part of the antagonist's efforts to counter the protagonist. |
| The Jester/Trickster | Character who engages in comedy and/or mischief, often subverting things that other characters take seriously. |
| The Love Interest/Quest Object | Character whom the protagonist is seeking or trying to please, either romantically or for another reason. |
| The Opposer/Skeptic | Character who opposes or contradicts the protagonist. |
| The Orphan/Regular Guy or Gal | Character who is realistic, everyday and identifiable. |
| The Rebel/Outsider | Character who contradicts the existing order or status quo. |
| The Shapeshifter/Flip-Flopper | Character who is continually shifting between good and evil; sometimes will be a friend or romatic interest of the protagonist who goes back and forth from being a positive and negative force. |
| The Sidekick/Helper | Character who faithfully supports the protagonist or antagonist. |
| The Villain/Antagonist | Character who is the enemy and opposite of the protagonist, who works to deflect the protagonist from his or her goal. |

MEDIA CONTENT ONTOLOGY

BACKGROUND

Consumers of media content, such as television (TV) content, movies, and music content, for example, have more control over their consumption choices than ever before. However, that proliferation of choice imposes on a consumer the burden of acquiring at least the minimum information necessary to identify the particular items of content likely to be pleasing to that consumer. By contrast, the historical approach to the delivery of TV content, for example, provided comparatively few consumption choices that were dictated by the networks providing TV programming. That historical approach, while undesirably limiting consumer choice, advantageously relieved the consumer of the burden of choosing. As the number of media content choices continues to increase, and as the costs of choosing well become increasingly burdensome, media content providers and consumers alike can benefit from a solution enabling identification of media content desirable to a consumer, which does not require the consumer to actively choose.

SUMMARY

There are provided media content ontology systems and methods, substantially as shown in and/or described in connection with at least one of the figures, and as set forth more completely in the claims.

BRIEF DESCRIPTION OF THE DRAWINGS

FIG. 4B shows a list of exemplary content classifications based on character archetypes and their descriptions;

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, consumers of various types of media content, such as television (TV) content, movies, and music content, have more control over their consumption choices than ever before. However, and as also noted above, that very proliferation of choice imposes on a consumer the burden of acquiring at least the minimum information necessary to identify the particular items of content likely to be pleasing to that consumer. By contrast, the historical approach to the delivery of TV content, for example, provided comparatively few consumption choices that were dictated by the networks providing TV programming. That historical approach, while undesirably limiting consumer choice, advantageously relieved the consumer of the burden of choosing. As the number of media content choices continues to increase, and as the costs of choosing well become increasingly burdensome, media content providers and consumers alike can benefit from a solution enabling identification of media content desirable to a consumer, which does not require the consumer to actively choose.

The present application is directed in general to systems and methods for ontologically organizing data entries corresponding to assets, such as media content assets, into a content or other asset genome. Such a content or other asset genome can be utilized to provide a recommendation engine for identifying assets likely to be desirable to a consumer, as well as to support business intelligence (BI) analytics applications and enhanced asset search functionality.

In some implementations, as will be discussed with specificity and considerable detail in the present application, the systems and methods disclosed herein may take the form of media content ontology systems and methods designed to overcome the deficiencies in conventional approaches to classifying media content assets. Examples of such media content assets may include TV episodes or episodic series of TV content, feature length movies, video clips, advertising content, music, games, news content, books, and educational or instructional content, for example. In order to organize and inter-relate such a diverse population of media content assets, the present media content ontology solution includes a content genome database and ontology software. The ontology software, when executed by a computing platform processor, is configured to classify and cross-index media content assets having corresponding content genome database entries included in the content genome database, according to various criteria describing the objective qualities of each media content asset, which in turn correspond to a consumer's anticipated emotional or psychological response to each media content asset.

For example, in addition to the basic, high level properties of the media content assets (e.g., genre, names of character, identification of participating talent and their respective roles, and the like), the present solution is configured to classify media content assets based on more conceptual, granular, semantically expressed ontological attributes of each media content asset (e.g., storylines, settings, and dramatic archetypes), which in turn correspond to the anticipated psychological and/or emotional response on the part of a consumer of the content.

As a specific example, the criteria employed in classifying and cross-indexing TV or movie content may include not only the identification of characters or storylines present in the content, but the motivations of those characters, and/or the dramatic archetypes and themes of those storylines, as well as possibly a dramatic category to which the dramatic archetype may be seen to belong. As a result, the media content ontology systems and methods disclosed herein may enable identification of media content assets likely to be enjoyed by an individual or group of consumers based on the association of those media content assets with other media content assets having similar structural, ontological, psychological, and/or emotional attributes and identified as desirable to the particular individual or group of consumers.

It is noted that, in addition to enabling identification of media content assets likely to be enjoyed by an individual or group of consumers, the cross-indexing of media content assets disclosed in the present application provides powerful search capabilities, as well as providing analytical tools to support BI and related analytics. It is further noted that, although the present application focuses on the specific example of media content and media content assets, the principles disclosed herein may be applied across a wide variety of asset types. For example, the ontology systems and methods disclosed herein can be adapted for assets such as vacation packages, real or personal property holdings, and theme park attractions, to name a few.

Figure 1:
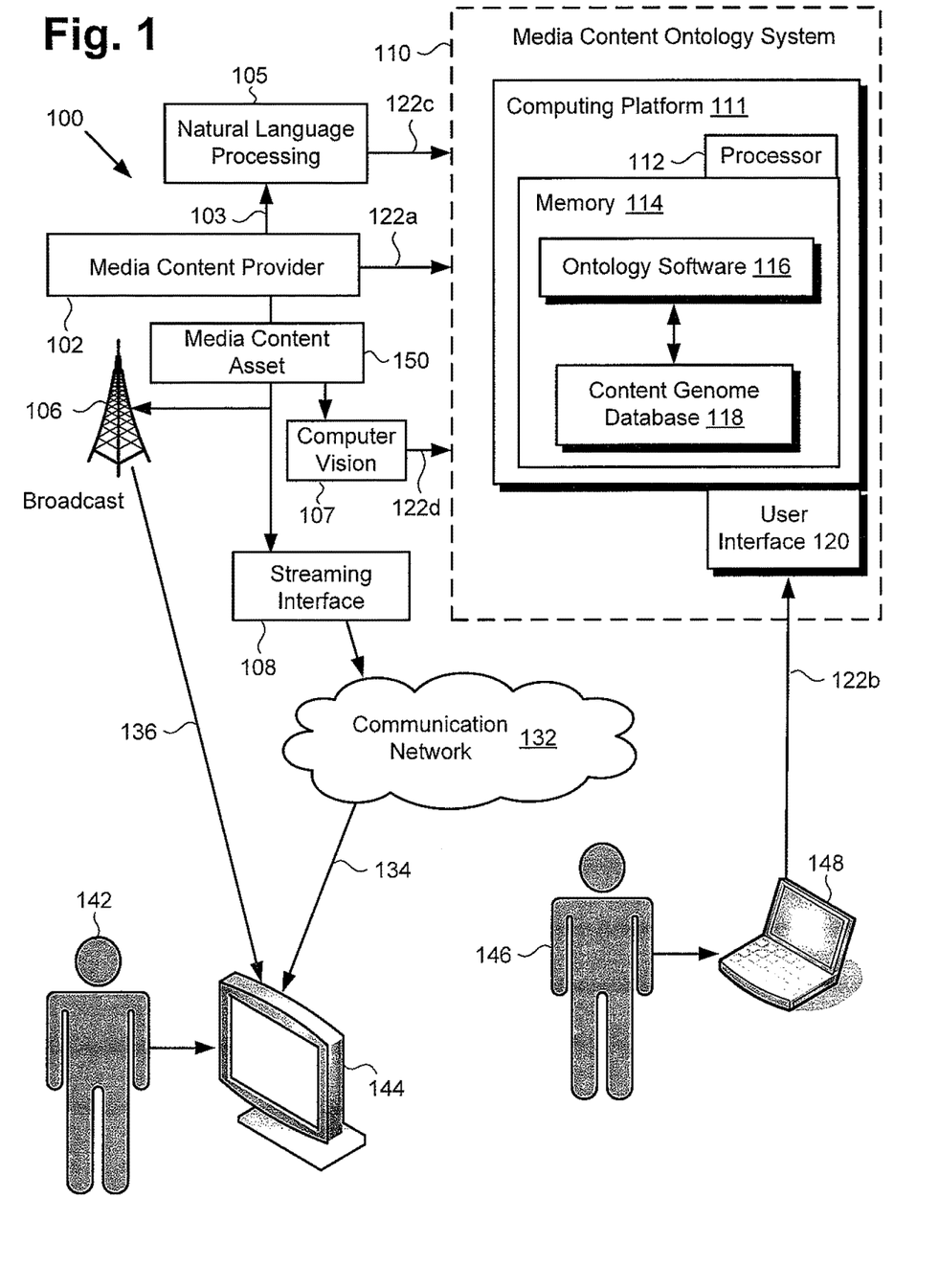
FIG. 1 shows a diagram of one exemplary implementation of a media content ontology system.

Referring to FIG. 1, FIG. 1 shows a diagram of one exemplary implementation of an ontology system in the form of media content ontology system 110. As shown in FIG. 1, media content ontology system 110 having computing platform 111 and user interface 120 is utilized in media content environment 100. Computing platform 111 includes processor 112 and memory 114. As further shown in FIG. 1, memory 114 includes ontology software 116 and content genome database 118 stored therein. Also shown in FIG. 1 is media content provider 102 providing media content asset 150 to broadcaster 106, computer vision analytical resource 107, and streaming interface 108, and providing data 103 corresponding to language attributes of media content asset 150 to natural language processing resource 105.

Media content provider 102 further provides data 122a describing media content asset 150 to media content ontology system 110. In addition, FIG. 1 shows communication network 132, consumer 142 using entertainment system 144 to receive one or both of network stream 134 and broadcast stream 136, and user 146 utilizing user system 148 and user interface 120 to provide data 122b, which may be a tag or annotation describing media content asset 150, for example, to media content ontology system 110. As further shown in FIG. 1, media content ontology system is also configured to receive data 122c from natural language processing resource 105 and data 122d from computer vision analysis resource 107. It is noted that data 122c and 122d are additional data describing media content asset 150.

Natural language processing resource 105 may be configured to receive data 103 corresponding to language attributes of media content asset 150, such as scripts or closed captioning, for example, from media content provider 102, and to provide data 122c describing those attributes of media content asset 150 to media content ontology system 110. Computer vision analytical resource 107 may be configured to receive media content asset 150 from media content provider 102, to analyze media content asset 150, and to provide data 122d describing media content asset 150 to media content ontology system 110. Streaming interface 108 may be configured to adapt media content asset 150 from media content provider 102 for distribution to entertainment system 144 over communication network 132, as network stream 134. Analogously, broadcaster 106 may be configured to adapt media content asset 150 for distribution to entertainment system 144 as broadcast stream 136.

It is noted that although entertainment system 144 is depicted as a Smart TV, and user system 148 is depicted as a laptop type personal computer (PC), in FIG. 1, one or both of entertainment system 144 and user system 148 may be implemented as any personal communication device with display capabilities. For example, in other implementations, one or both of entertainment system 144 and user system 148 may take the form of a desktop computer, a netbook, a tablet computer, a gaming console, or a Smartphone, for example. It is further noted that although data 122a is shown in FIG. 1 to be provided by media content provider 102, data 122b is shown to be provided through user interface 120, data 122c is shown to be provided by natural language processing resource 105, and data 122d is shown to be provided by computer vision analytical resource 107, those representations are merely exemplary. In other implementations, either one or more of data 122a, data 122b, data 122c, and data 122d may be omitted, while other data for use by media content ontology system 110 may be provided by one or more data sources not explicitly depicted in FIG. 1.

Figure 2:
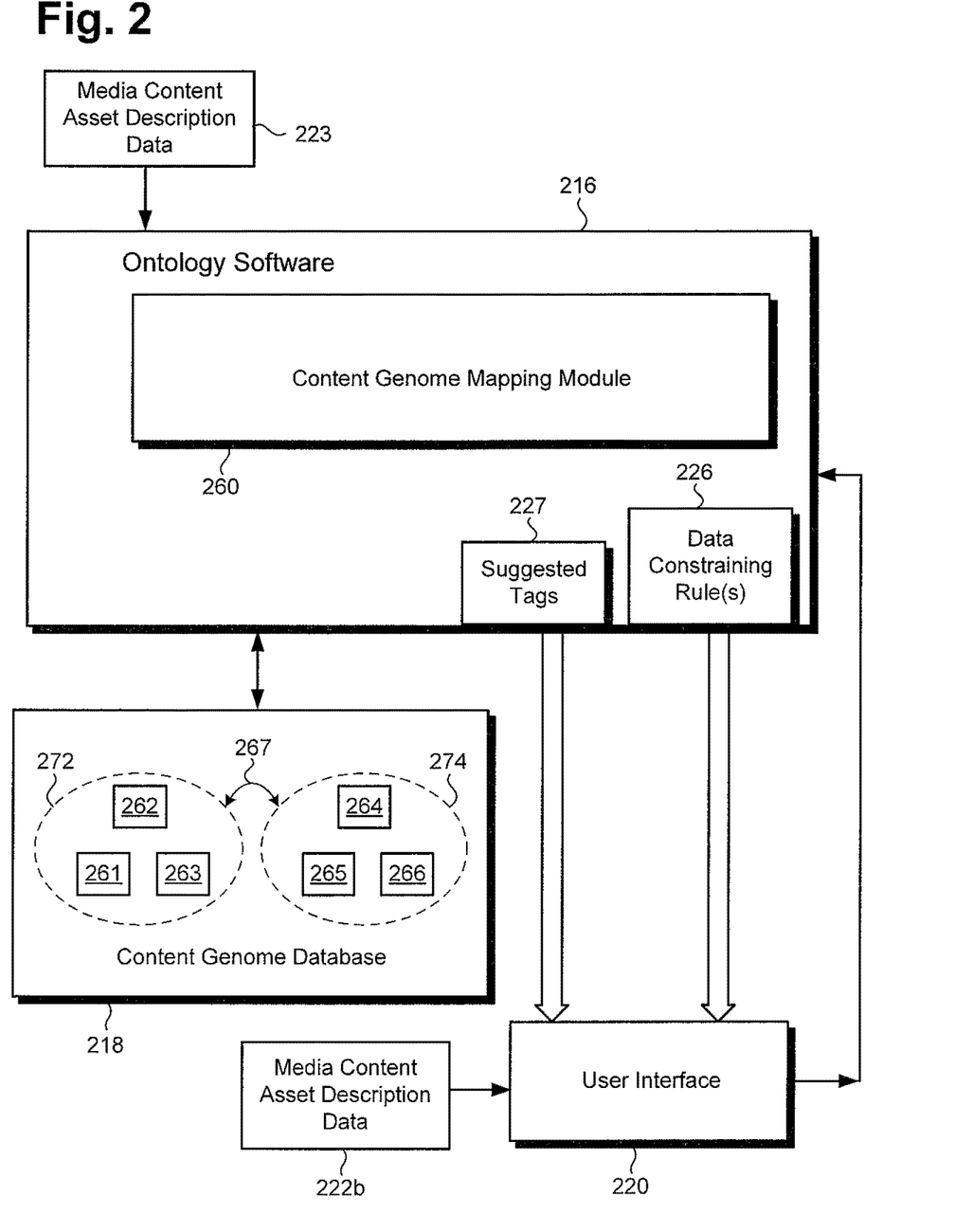
FIG. 2 shows a more detailed representation of ontology software and a content genome database suitable for use in the media content ontology system of FIG. 1, according to one exemplary implementation.

Continuing to FIG. 2, FIG. 2 shows a more detailed representation of ontology software 216 and content genome database 218 suitable for use in media content ontology system 110 in FIG. 1, according to one exemplary implementation. As shown in FIG. 2, ontology software 216 includes content genome mapping module 260, and is configured to receive media content asset description data 223, to receive media content asset description data 222b through user interface 220, and to generate data constraining rule or rules 226 and/or suggested tags 227. Also shown in FIG. 2 is content genome database 218 including content genome database entry 261, content genome database entry 262, and content genome database entry 263 (hereinafter "content genome database entries 261-263"), as well as content genome database entry 264, content genome database entry 265, and content genome database entry 266 (hereinafter "content genome database entries 264-266").

According to the exemplary implementation shown in FIG. 2, content genome database entries 261-263 are associated as a result of corresponding respectively to media content assets commonly mapped to content classification 272, while content genome database entries 264-266 are analogously associated due to their corresponding media content assets being commonly mapped to content classification 274. Moreover, and as further shown by cross-indexing linkage 267, one or more of content genome database entries 261-263 may be cross-indexed with one or more of content genome database entries 264-266. Ontology software 216, content genome database 218, user interface 220, and media content asset description data 222b (hereinafter "tagged data 222b") correspond in general to ontology software 116, content genome database 118, user interface 120, and data 122b, in FIG. 1. Moreover, media content description data 223 (hereinafter "data 223"), in FIG. 2, corresponds to any one or more of data 122a, 122c, and 122d, in FIG. 1.

Referring to FIGS. 1 and 2 together, media content ontology system 110 may utilize processor 112 to execute ontology software 116/216 to classify and cross-index content genome database entries 261-263 and 264-266 and thereby cross-index their respectively corresponding media content assets. For example, ontology software 116/216, under the control of processor 112 may be configured to utilize content genome mapping module 260 to map media content asset 150 to a first content classification corresponding to content classification 272 based on a first data corresponding to data 223. Ontology software 116/216, under the control of processor 112, may be configured to further utilize content genome mapping module 260 to map media content asset 150 to a second content classification corresponding to content classification 274 based on a second data corresponding to tagged data 222b.

Ontology software 116/216 may also be configured to generate a first content genome database entry, i.e., content genome database entry 262, associating media content asset 150 with other media content assets mapped to content classification 272, i.e., media content assets corresponding respectively to content genome database entries 261 and 263. In addition, ontology software 116/216 may be configured to generate a second content genome database entry, i.e., content genome database entry 264, associating media content asset 150 with other media content assets mapped to content classification 274, i.e., media content assets corresponding respectively to content genome database entries 265 and 266. Ontology software 116/216 is further configured to cross-index first and second content genome database entries 262 and 264 to enable identification of each of content classification 272, content classification 274, and media content asset 150 based on any one of content classification 272, content classification 274, or media content asset 150.

Moreover, in some implementations, ontology software 116/216 may be configured to modify the classification structure of content genome database 118/218 based on one or more of data 223 and tagged data 222b. For example, ontology software 116/216 may be configured to add a new content classification to existing content classifications 272 and 274, to eliminate one or both of content classifications 272 and 274, or to reclassify one or both of content classifications 272 and 274. In some implementations in which modification of the classification structure of content genome database 118/218 is permitted, such modification may require approval by an authorized user, such as user 146, prior to being applied to content genome database 118/218.

Furthermore, in some implementations, ontology software 116/216 may be configured to generate one or more data constraining rule(s) 226 for constraining one or both of data 223 and 222b based on a predetermined content classification to which media content asset 150 has been mapped. As a specific example of this latter feature, in implementations in which media content asset 150 has been predetermined to include a movie representative of a specific historical period, data constraining rule(s) 226 may prohibit user 146 from utilizing user interface 120/220 to enter tagged data 222b describing media content asset 150 that is historically inaccurate or is inconsistent with historical verisimilitude.

In addition, or alternatively, ontology software may be configured to generate additional data or suggested tags 227 for use by user 146 in generating tagged data 222b through user interface 220. For example, ontology software 116/216 may be configured to infer characteristics of one or more attributes of media content asset 150 based on data 223 and/or tagged data 222b. As a specific example, where media content asset 150 includes a character that is described by one of data 122a or tag data 122b as "a female", and by another instance of one of data 122a or tag data 122b as "a parent", ontology software 116/216 may be configured to infer that the character is "a mother", despite the absence of descriptive data expressly identifying the character as "a mother." Moreover, ontology software 116/216 may be configured to perform such inferencing to generate suggested tags 227 for entry by user 146 as tagged data 222b.

The inferencing performed by ontology software 116/216 may be absolute or probabilistic. For example, in implementations in which ontology software 116/216 performs only absolute inferencing, the inferential identification of attributes may only occur where the likelihood of accuracy is substantially one hundred percent. However, in some implementations, it may be advantageous or desirable to enable probabilistic inferencing by ontology software 116/216. In those latter implementations, ontology software 116/216 may be configured to infer attributes when the likelihood of accuracy meets or exceeds a confidence threshold of less than one hundred percent.

FIGS. 1 and 2 will now be further described by reference to FIG. 3, which presents flowchart 300 describing an exemplary method for use by a media content ontology system to classify and cross-index media content assets. With respect to the method outlined in FIG. 3, it is noted that certain details and features have been left out of flowchart 300 in order not to obscure the discussion of the inventive features in the present application.

Figure 3:
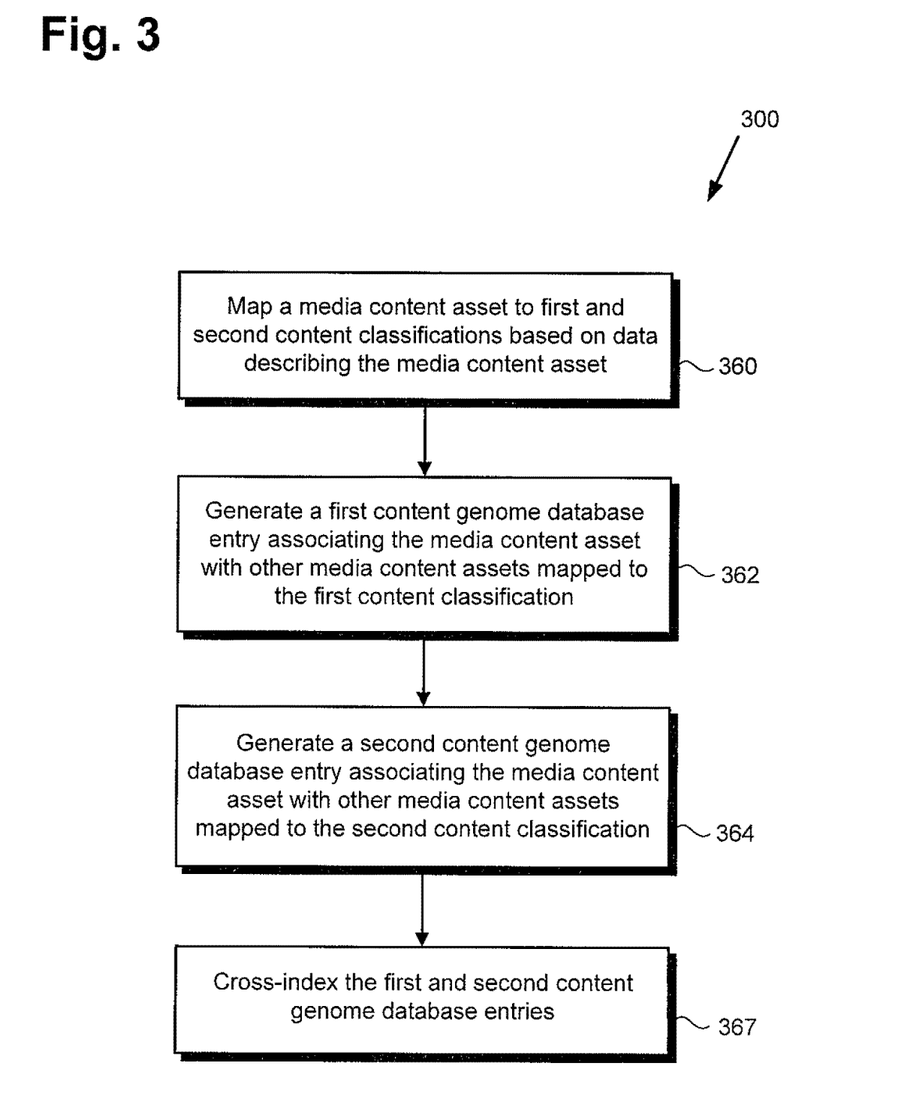
FIG. 3 is a flowchart presenting an exemplary method for use by a media content ontology system to classify and cross-index media content assets.

Referring to FIG. 3 in combination with FIGS. 1 and 2, flowchart 300 begins with mapping media content asset 150 to first and second content classifications 272 and 274 based on respective first and second data 122a/122c/122d/223 and 122b/222b describing media content asset 150 (action 360). As shown in FIGS. 1 and 2, first and second data 122a/122c/122d/223 and 122b/222b, respectively, are received by media content ontology system 110 for use by ontology software 116/216. Mapping of media content asset 150 to first and second content classifications 272 and 274 based on respective first and second data 122a/122c/122d/223 and 122b/222b may be performed by ontology software 116/216 executed by processor 112, and utilizing content genome mapping module 260.

As stated above, media content asset 150 may correspond to a wide variety of media content including TV episodes or episodic series of TV content, feature length movies, video clips, advertising content, music, games, news content, books, and educational or instructional content, to name a few. For the purposes of conceptual clarity, the present method will be further described below with reference specifically to dramatic content corresponding to one or both of TV content or movie content. It is noted that as used herein, the term "dramatic" applies broadly to media content including dramas, melodramas, comedies, thrillers, science fiction, fantasy, and other genres characterized by a plot having one or more storylines and expressed through the words and actions of one or more characters. Moreover, it is further noted that the actions described by flowchart 300 may be analogously adapted to other types of content, such as the exemplary video clips, advertising content, music, games, news content, and educational or instructional content identified above, for example.

First and second data 122a/122c/122d/223 and 122b/222b may include digital data describing media content asset 150 in terms of the basic, high level properties of media content asset 150 (e.g., genre, names of character, identification of participating talent and their respective roles, and the like). However, first and second data 122a/122c/122d/223 and 122b/222b may include data describing media content asset 150 based on its more conceptual, granular, semantically expressed ontological attributes (e.g., storylines, settings, and dramatic archetypes), which in turn correspond to the anticipated psychological and/or emotional response on the part of consumer 142 to media content asset 150. Moreover, second data 122b/222b may be provided by user 146 through user interface 120/220 as tagged data describing such structural and/or dramatic attributes of media content asset 150.

Thus, first data 122*a*/122*c*/122*d*/223 and second data 122*b*/222*b* may describe ontological, psychological, and/or emotional attributes of media content asset 150, as well as its high level properties. In addition, in some implementations, first data 122*a*/122*c*/122*d*/223 and second data 122*b*/222*b* may include ratings data and/or financial data corresponding to media content asset 150. For example, first data 122*a*/122*c*/122*d*/223 and/or second data 122*b*/222*b* may include information regarding a budget for media content asset 150, a budget overrun experienced in the production of media content asset 150, or the return on investment (ROI) calculated for media content asset 150.

For example, first data 122*a*/122*c*/122*d*/223 and/or second data 122*b*/222*b* include data describing an overall dramatic plot occurring across scenes, episodes and seasons, storylines within the plot, or characters included in media content asset 150. For example, where first data 122*a*/122*c*/122*d*/223 and/or second data 122*b*/222*b* describe the overall dramatic plot, that data may describe a story archetype, and/or a dramatic characteristic of a character involved in that plot, and/or a setting associated with a storyline tied to that plot.

Figure 4A:
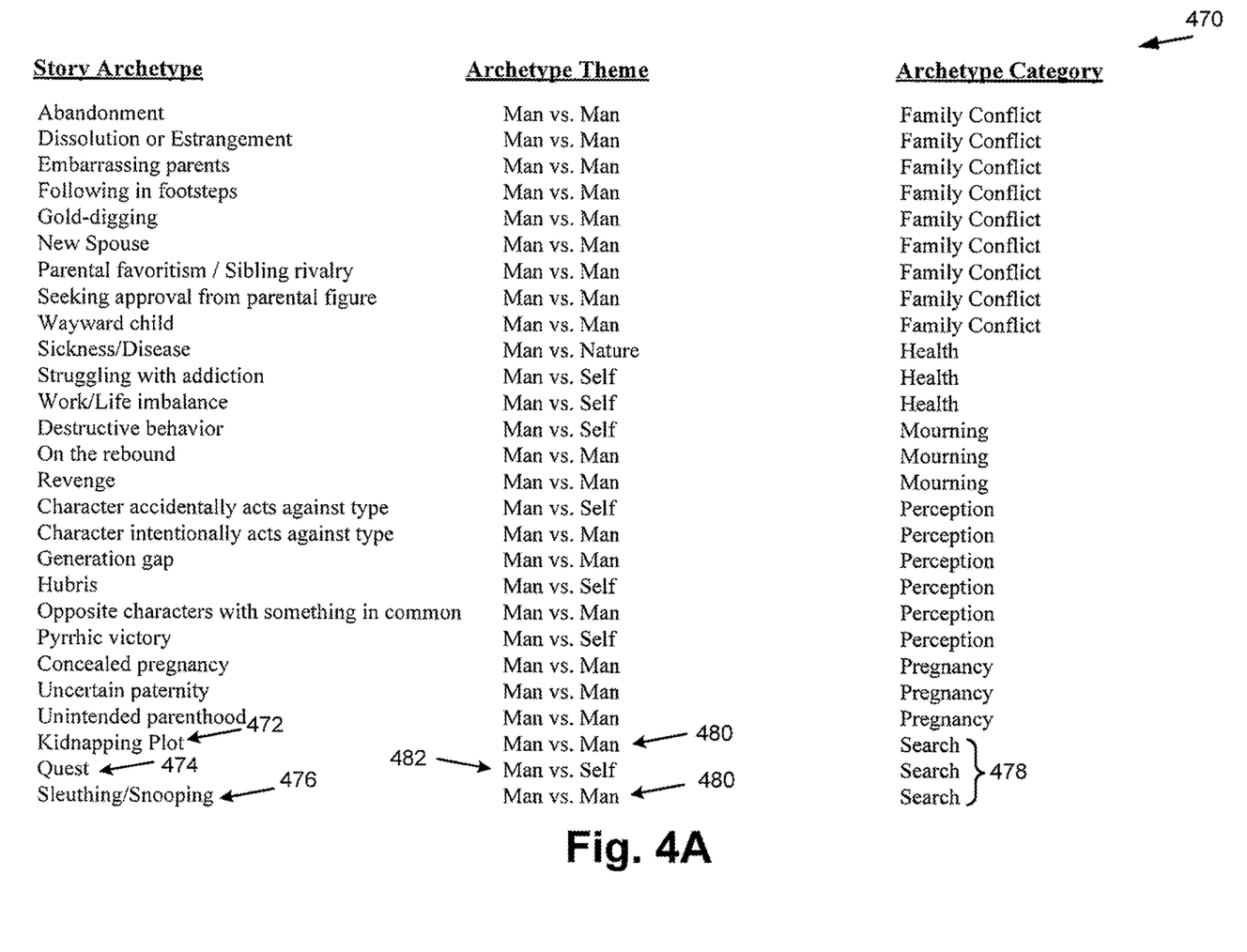
FIG. 4A shows a list of exemplary content classifications based on story archetype, the theme represented by such a story archetype, and a category with which the story archetype may be identified.

Referring to FIG. 4A, FIG. 4A shows a list of exemplary content classifications to which first data 122*a*/122*c*/122*d*/223 and/or second data 122*b*/222*b* may correspond based on story archetype, the theme represented by such a story archetype, and a category with which the story archetype may be identified. For example, a story archetype of media content asset 150 may be identified as "kidnapping plot" 472, "quest" 474, or "sleuthing/snooping" 476 in which a character unofficially investigates the personal matters of another character. The story archetypes 472, 474, and 476 can be described as having the common archetype category "search" 478. Moreover, the story archetypes 472 and 476 may share the common archetype theme "Man vs. Man" 480, in which the primary driver of action is a conflict between two or more characters, while story archetype 474 is described as having archetype theme "Man vs. Self" 482.

It is noted that although the exemplary story archetypes, archetype themes, and archetype categories represented in FIG. 4A may be used to describe media content asset 150 as a whole, in some implementations, media content asset 150 may be described at finer levels of granularity. For example, media content asset 150 may be described as having an overarching dramatic plot that interweaves multiple storylines. In that case, the exemplary story archetypes, archetype themes, and archetype categories represented in FIG. 4A may be applied to each storyline individually as well as, or as an alternative to, application of those descriptions to media content asset 150 as a whole.

In addition, media content asset 150 and/or the storylines within it may be categorized according to the type of dramatic conclusion provided by media content asset 150. For example, first data 122*a*/122*c*/122*d*/223 and/or second data 122*b*/222*b* may include a description of how dramatic conflicts within the overall dramatic plot or individual storylines of media content asset 150 are resolved. Alternatively, first data 122*a*/122*c*/122*d*/223 and/or second data 122*b*/222*b* may describe such dramatic conflicts as being unresolved, for example where a scene within media content asset 150 or a storyline within media content asset 150 can be described as a "cliffhanger." Moreover, where media content asset 150 includes episodic dramatic content, first data 122*a*/122*c*/122*d*/223 and/or second data 122*b*/222*b* may describe features of the series to which media content asset 150 belongs, rather than to media content asset 150 per se.

As noted above, in addition to describing the overall dramatic plot of media content asset 150, or storylines within that plot, first data 122*a*/122*c*/122*d*/223 and/or second data 122*b*/222*b* may include data describing characters presented in media content asset 150. For example, first data 122*a*/122*c*/122*d*/223 and/or second data 122*b*/222*b* may include data describing the characters themselves, their traits and/or motivations, and the actions flowing from those traits and motivations, as well as the relationships amongst characters.

Figure 4C:
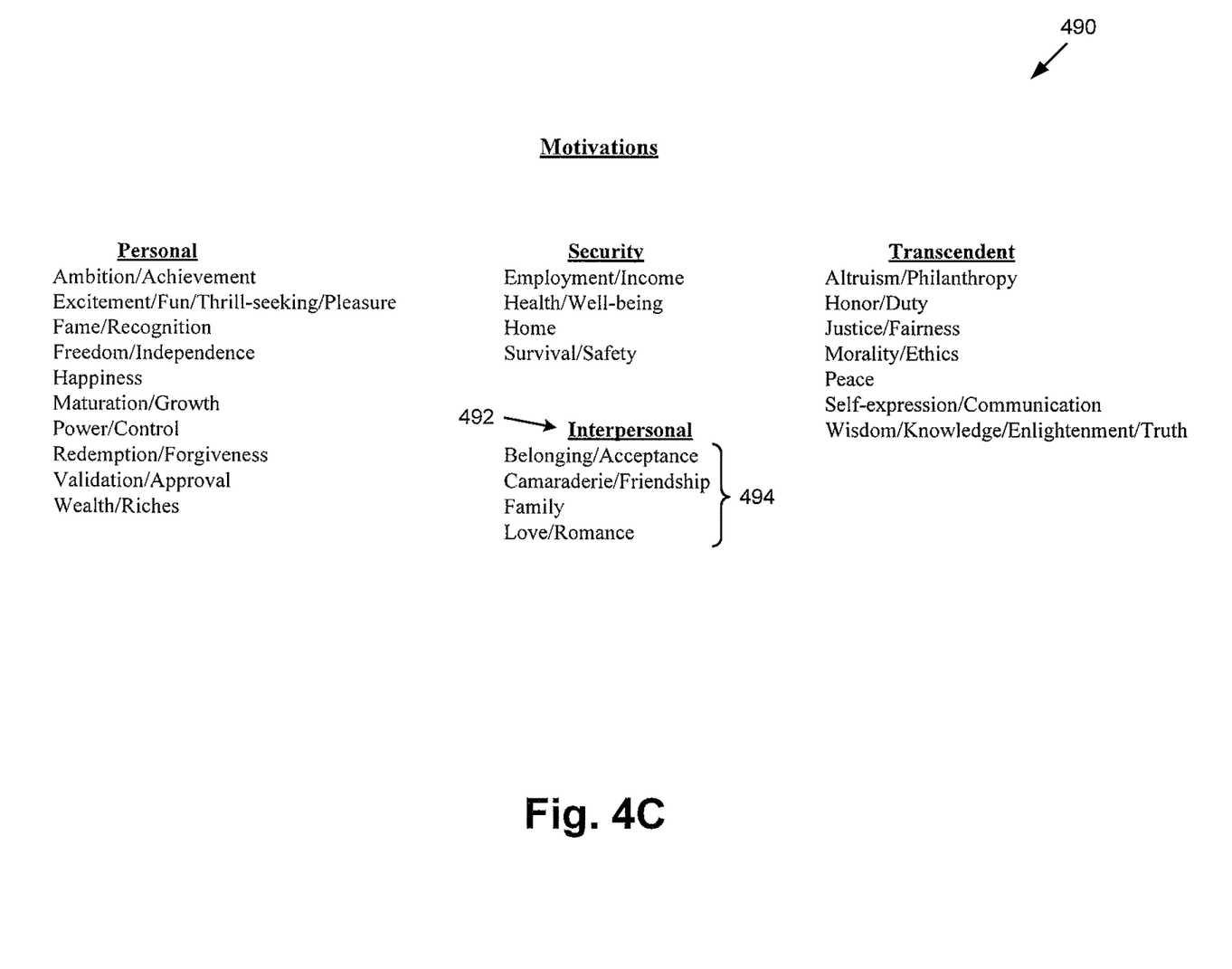
FIG. 4C shows a list of exemplary character motivations grouped by category.

Referring to FIG. 4B and FIG. 4C, FIG. 4B shows a list of exemplary content classifications based on character archetypes and their descriptions, while FIG. 4C shows a list of exemplary character motivations grouped by category. As a specific example, one of the character archetypes shown in FIG. 4B is identified as "Creator/Magician/Visionary" character archetype 488 and is described as a "character who helps make miraculous things happen or dreams and visions come true in a way that surpasses expectations, typically in furtherance of the protagonist's quest." In addition, FIG. 4C shows various motivational categories attributable to characters, as well as exemplary character motivations associated with those categories. For example, motivational category "Interpersonal" 492 includes group of character motivations 494 including "Belonging/Acceptance", "Camaraderie/Friendship", "Family", and "Love/Romance".

Referring back to FIG. 3 with additional reference to FIGS. 1 and 2, flowchart 300 continues with generating first content genome database entry 262 associating media content asset 150 with other media content assets mapped to first content classification 272 (action 362). Generation of first content genome database entry 262 may be performed by ontology software 116/216 executed by processor 112. As discussed above, first content classification 272 may associate media content asset 150 with media content assets corresponding to respective content genome database entries 261 and 263 based on any of various criteria, including a dramatic archetype of media content asset 150. Examples of the criteria corresponding to first content classification 272 may include story archetype, character archetype, actions or events, and character traits, to name a few. In addition, or alternatively, first content classification 272 may correspond to a storyline within an overall plot of media content asset 150.

Flowchart 300 continues with generating second content genome database entry 264 associating media content asset 150 with other media content assets mapped to second content classification 274 (action 364). Generation of second content genome database entry 264 may be performed by ontology software 116/216 executed by processor 112. As discussed above, second content classification 274 may associate media content asset 150 with media content assets corresponding respectively to content genome database entries 265 and 266 based on any of various criteria, including a dramatic archetype of media content asset 150.

As further discussed above, examples of the criteria corresponding to second content classification 274 may include story archetype, character archetype, actions or events, and character traits, to name a few. In addition, or alternatively, second content classification 274 may correspond to a storyline within an overall plot of media content asset 150. Moreover, in implementations in which first content classification 272 corresponds to a first storyline within an overall plot of media content asset 150, second content classification 274 may correspond to a second storyline within the overall plot of media content asset 150.

Flowchart 300 concludes with cross-indexing first and second content genome database entries 262 and 264 (action 367). Cross-indexing of first and second content genome database entries 262 and 264 may be performed by ontology software 116/216 executed by processor 112. Such cross-indexing, shown by cross-indexing linkage 267, in FIG. 2, is performed so as to enable identification of each of first and second content classifications 272 and 274 and media content asset 150 based on any one of first or second content classifications 272 and 274 or media content asset 150.

Figure 5:
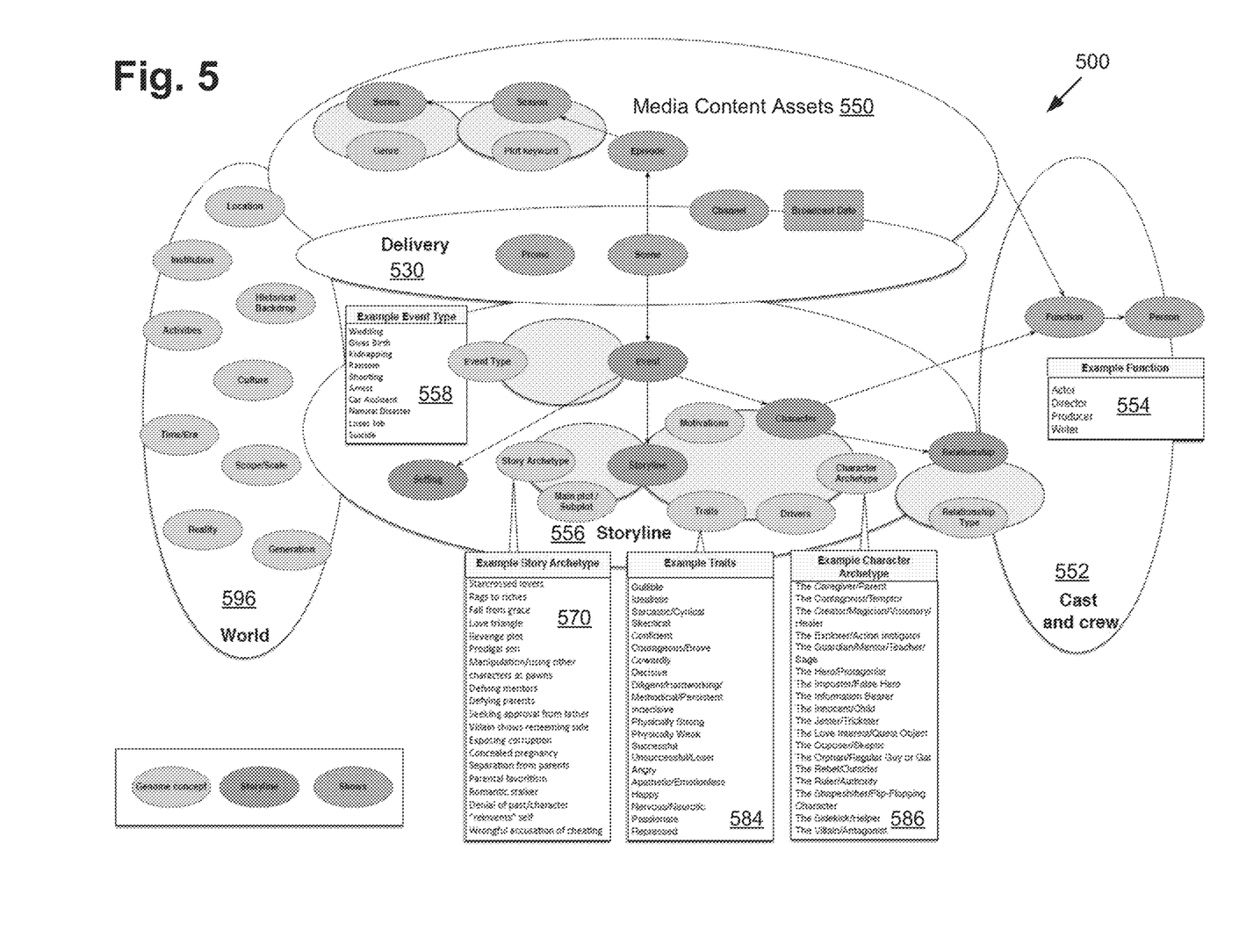
FIG. 5 shows a conceptual overview of an exemplary content genome, according to one implementation.

Referring to FIG. 5, FIG. 5 shows a conceptual overview of exemplary content genome 500, according to one implementation. According to the exemplary implementation shown in FIG. 5, content genome 500 includes media content assets 550, which are shown to be interrelated with delivery modes 530 for providing media content assets 550, the cast and crew 552 of media content assets 550, the plots and storylines 556 of media content assets 550, and the dramatic world at large 596.

As shown in FIG. 5, cast and crew 552 include exemplary functions 554 of actor, director, producer, and writer, any of which may correspond to a content classification of media content assets 550. Plot or storyline 556 includes exemplary actions or event types 558, story archetypes 570, character traits 584, and character archetypes 586. It is noted that story archetypes 570 and character archetypes 586 correspond in general to story archetypes 470 and character archetypes 486 in respective FIGS. 4A and 4B. The world of the story 596 includes exemplary organizations, activities, or historical backgrounds associated with the dramatic context or backdrop of media content assets 550, for example, any of which may also correspond to a content classification of media content assets 550.

Although not explicitly depicted in the present figures, in some implementations, ontology software 116/216 may be further configured to associate one or both of first and second content genome database entries 262 and 264 with a data external to media content ontology system 110, in FIG. 1. For example, ontology software 116/216 may be configured to associate one or both of first and second content genome database entries 262 and 264 with data in the form of entries in one or more third party databases, such as knowledge bases, accessible over communication network 132, which, in some implementations, may correspond to the Internet. As a specific example, ontology software 116/216 may be configured to associate one or both of first and second content genome database entries 262 and 264 with an Internet Movie Database (IMDb)™ or Wikipedia™ entry for media content asset 150.

Thus, the media content ontology solution disclosed in the present application is configured to classify media content assets based on conceptual, granular, semantically expressed ontological attributes of each media content asset, which in turn correspond to the anticipated psychological and/or emotional response on the part of a consumer of the content, as well as the basic, high level properties of the media content asset. For example, the criteria employed in classifying and cross-indexing TV or movie content may include not only the identification of characters or storylines present in the content, but the traits of those characters, and/or the dramatic archetypes of those storylines, as well as a genre to which the dramatic archetype may be seen to belong. As a result, the media content ontology systems and methods disclosed herein can enable identification of media content assets likely to be enjoyed by an individual or group of consumers based on the association of those media content assets with other media content assets having similar ontological, psychological, and/or emotional attributes.

In addition to enabling identification of media content assets likely to be enjoyed by an individual or group of consumers, the cross-indexing of media content assets disclosed in the present application provides powerful search capabilities, as well as providing analytical tools to support BI and related analytics. Moreover, although the present inventive solution has been described by reference to the specific example of media content and media content assets in the interests of conceptual clarity, the principles disclosed herein may be applied across a wide variety of asset types. For example, and as noted above, the ontology systems and methods disclosed herein can be adapted for use with assets such as vacation packages, real or personal property holdings, and theme park attractions, to name a few.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A media content ontology system comprising:
a computing platform having a processor and a memory;
a content genome database stored in the memory;
a user interface; and
the processor configured to execute an ontology software to:
map a media content asset to first and second content classifications based on respective first and second data describing the media content asset, wherein the first data is received through the user interface, and the second data comprises image analysis data received from an image processing system communicatively coupled to the computing platform;
infer a third data describing the media content asset based on the first data and the second data describing the media content asset when a likelihood of the third data describing the media content asset meets or exceeds a confidence threshold of less than one hundred percent;
generate a first content genome database entry associating the media content asset mapped to the first content classification with other media content assets previously mapped to the first content classification;
generate a second content genome database entry associating the media content asset mapped to the second content classification with other media content assets previously mapped to the second content classification;
generate a third content genome database entry associating the media content asset mapped to a third content classification based on the third data with other media content assets previously mapped to the third content classification;
cross-index the first, second and third content genome database entries to enable identification of each of the first, second and third content classifications and the media content asset based on any one of the first, second or third content classifications or the media content asset; and identify a new media content asset desirable to a consumer using the cross-indexed first, second and third content genome database entries.

2. The media content ontology system of claim 1, wherein the processor is further configured to execute the ontology software to modify a classification structure of the content genome database, based on at least one of the first data or the second data.

3. The media content ontology system of claim 2, wherein the processor is further configured to execute the ontology software to modify the classification structure of the content genome database by at least one of adding a new content classification, eliminating an existing content classification, or reclassifying the existing content classification.

4. The media content ontology system of claim 1, wherein at least one of the first content classification or the second content classification is identified based on conceptual, granular, and semantically expressed ontological attributes of the media content asset, which in turn correspond to at least one of an anticipated psychological response or an anticipated emotional response on the part of the consumer of the media content asset.

5. The media content ontology system of claim 1, wherein the media content asset comprises television content.

6. The media content ontology system of claim 5, wherein at least one of the first content classification or the second content classification corresponds to one of a scene, an episode, or a season of the television content.

7. The media content ontology system of claim 1, wherein the media content asset comprises one of movie content, a video clip, advertising content, music, a game, news content, a book, or educational or instructional content.

8. The media content ontology system of claim 1, wherein the first and second content classifications correspond respectively to first and second storylines within an overall plot of the media content asset.

9. The media content ontology system of claim 1, wherein at least one of the first content classification or the second content classification corresponds to a dramatic archetype of the media content asset.

10. The media content ontology system of claim 1, wherein at least one of the first content classification or the second content classification corresponds to a character archetype of a character included in the media content asset.

11. The media content ontology system of claim 1, wherein the processor is further configured to execute the ontology software to associate at least one of the first content genome database entry or the second content genome database entry with data external to the media content ontology system.

12. The media content ontology system of claim 1, wherein the processor is further configured to execute the ontology software to generate at least one rule for constraining at least one of the first data or the second data based on a predetermined content classification to which the media content asset has been mapped.

13. The media content ontology system of claim 1, wherein the processor is further configured to execute the ontology software to generate at least one suggested tag for use in generating one of the first data or the second data based on a predetermined content classification to which the media content asset has been mapped.

14. A method for use by a media content ontology system including a computing platform having a processor, a memory having stored therein a content genome database, a user interface, and an ontology software, the method comprising:

mapping, using the ontology software being executed by the processor, a media content asset to first and second content classifications based on respective first and second data describing the media content asset, wherein the first data is received through the user interface, and the second data comprises image analysis data received from an image processing system communicatively coupled to the computing platform;

inferring, using the ontology software being executed by the processor, a third data describing the media content asset based on the first data and the second data describing the media content asset when a likelihood of the third data describing the media content asset meets or exceeds a confidence threshold of less than one hundred percent;

generating, using the ontology software being executed by the processor, a first content genome database entry associating the media content asset mapped to the first content classification with other media content assets previously mapped to the first content classification;

generating, using the ontology software being executed by the processor, a second content genome database entry associating the media content asset mapped to the second content classification with other media content assets previously mapped to the second content classification;

generating, using the ontology software being executed by the processor, a third content genome database entry associating the media content asset mapped to a third content classification based on the third data with other media content assets previously mapped to the third content classification;

cross-indexing, using the ontology software being executed by the processor, the first, second and third content genome database entries to enable identification of each of the first, second and third content classifications and the media content asset based on any one of the first, second or third content classifications or the media content asset; and identifying, using the ontology software being executed by the processor, a new media content asset desirable to a consumer using the cross-indexed first, second and third content genome database entries.

15. The method of claim 14, further comprising modifying, using the ontology software being executed by the processor, a classification structure of the content genome database, based on at least one of the first data or the second data.

16. The method of claim 15, wherein modifying the classification structure of the content genome database comprises at least one of adding a new content classification, eliminating an existing content classification, or reclassifying the existing content classification.

17. The method of claim 14, wherein at least one of the first content classification or the second content classificationis identified based on conceptual, granular, semantically expressed ontological attributes of the media content asset, which in turn correspond to at least one of an anticipated psychological response or an anticipated emotional response on the part of the consumer of the media content asset.

18. The method of claim 14, wherein the media content asset comprises television content.

19. The method of claim 18, wherein at least one of the first content classification or the second content classification corresponds to one of a scene, an episode, or a season of the television content.

20. The method of claim 14, wherein the media content asset comprises one of movie content, a video clip, advertising content, music, a game, news content, a book, or educational or instructional content.

21. The method of claim 14, wherein the first and second content classifications correspond respectively to first and second storylines within an overall plot of the media content asset.

22. The method of claim 14, wherein at least one of the first content classification or the second content classification corresponds to a dramatic archetype of the media content asset.

23. The method of claim 14, wherein at least one of the first content classification or the second content classification corresponds to a character archetype of a character included in the media content asset.

24. The method of claim 14, further comprising associating, using the ontology software being executed by the processor, at least one of the first content genome database entry or the second content genome database entry with data external to the media content ontology system.

25. The method of claim 14, further comprising generating, using the ontology software being executed by the processor, at least one rule for constraining at least one of the first data or the second data based on a predetermined content classification to which the media content asset has been mapped.

26. The method of claim 14, further comprising generating, using the ontology software being executed by the processor, at least one suggested tag for use in generating one of the first data or the second data based on a predetermined content classification to which the media content asset has been mapped.

* * * * *